United States Patent [19]

Matsumura

[11] 4,232,258
[45] Nov. 4, 1980

[54] SPEED CONTROL APPARATUS FOR ELECTRIC MOTOR

[75] Inventor: Nobuyoshi Matsumura, Yao, Japan

[73] Assignee: Maruzen Sewing Machine Co., Ltd, Moriguchi, Japan

[21] Appl. No.: 888,404

[22] Filed: Mar. 20, 1978

[30] Foreign Application Priority Data

Apr. 6, 1977 [JP] Japan .................................. 52-40158
Sep. 9, 1977 [JP] Japan ................................ 52-131550
Dec. 1, 1977 [JP] Japan ................................ 52-144808

[51] Int. Cl.$^2$ .............................................. H02P 7/24
[52] U.S. Cl. ................................................. 318/345 H
[58] Field of Search ............. 318/345 H, 345 D, 294, 318/ 674; 307/252 B

[56] References Cited

U.S. PATENT DOCUMENTS

| | | | |
|---|---|---|---|
| 3,436,562 | 4/1969 | Harris, Jr. ......................... | 307/252 B |
| 3,594,591 | 7/1971 | Laupman .......................... | 307/252 B |
| 3,634,874 | 1/1972 | Mason .............................. | 318/345 H |
| 3,638,043 | 1/1972 | Laupman .......................... | 307/252 B |
| 3,639,822 | 2/1972 | Brown et al. ..................... | 318/345 H |
| 3,676,706 | 7/1972 | Laupman .......................... | 307/252 B |
| 3,727,080 | 4/1973 | Hanchett .......................... | 307/252 B |
| 3,727,104 | 4/1973 | Neal et al. ........................ | 307/252 B |
| 3,745,382 | 7/1973 | Hoge et al. ....................... | 307/252 B |
| 3,786,328 | 1/1974 | Bos .................................. | 307/252 B |
| 3,840,800 | 10/1974 | Laupman .......................... | 307/252 B |

*Primary Examiner*—J. V. Truhe
*Assistant Examiner*—Eugene S. Indyk
*Attorney, Agent, or Firm*—Arnstein, Gluck, Weitzenfeld & Minow

[57] ABSTRACT

A direct current obtained by rectifying an alternating current voltage by means of a diode bridge circuit is applied to a direct current motor connected to the diode bridge circuit. Use is made of the fact that the voltage developed across the diode bridge circuit varies, depending on the magnitude of the induced voltage across the motor. To that end, the interjunction of a capacitor series circuit coupled to the bridge circuit is connected through a voltage responsive bidirectional switching device, such as a diac, to a control electrode of a voltage controlled bidirectional switching device, such as a triac, for phase control of the alternating current voltage. One electrode of the voltage responsive bidirectional switching device is coupled to a variable resistor provided in a gang fashion with a controller, such as a foot controller pedal, so that the voltage obtainable from the variable resistor is superposed on the voltage in the switching device, such as a diac. In operation, therefore, if and when the induced voltage across the motor decreases, an electric charge in the capacitor is discharged to be supplied to one electrode of the diac, thereby to control the voltage controlled bidirectional switching device, such that the conduction phase is increased and thus, the speed of the motor is increased. Preferably, the above described capacitor is provided with a series connected discharging resistor.

3 Claims, 3 Drawing Figures

SPEED CONTROL APPARATUS FOR ELECTRIC MOTOR

BACKGROUND OF THE INVENTION

1. Field of the Invention

The present invention relates to a speed control apparatus for an electric motor. More specifically, the present invention relates to a speed control apparatus for a sewing machine driven by an electric motor energized by an alternating current as phase controlled by a voltage controlled switching device.

2. Description of the Prior Art

Heretofore, a sewing machine adapted to be driven by a universal motor has been put into practical use. For the purpose of speed control of such motor, an alternating current, phase controlled by means of a voltage controlled bidirectional switching device, such as a triac, is applied to a universal motor for energization. On the other hand, a situation is encountered in such an electrically driven sewing machine where an overload is caused to the motor at the time when the needle penetrates into thick layers of cloth to be sewn, thereby decreasing the speed and rotational torque of the motor. In order to eliminate such a situation, it has been proposed that in phase controlling the alternating current by means of a voltage controlled bidirectional switching device, such as a triac, an induced voltage or a counter electromotive force of the motor is detected to be utilized additionally to control the conduction angle of the voltage controlled bidirectional switching device. More specifically, if and when a motor is subjected to an overload, the rotational speed decreases and, accordingly, the induced voltage across the motor diminishes. Therefore, the decrease of the induced voltage across the motor is detected and is utilized to increase the conduction angle of the voltage controlled bidirectional switching device, thereby to increase the rotational torque and the speed of the motor. However, a conventional circuit configuration for detecting the induced voltage across the motor for controlling the conduction angle of the triac is rather complicated, which makes the apparatus expensive.

As well known, for the purpose of speed control of an electrically driven sewing machine, a power supply is applied to a foot controller and a driving voltage, as controlled by the foot controller, is applied to an electric motor. A typical speed control of an electric motor comprises a so-called resistor control, which may comprise a carbon pile, a winding resistor and the like. According to such a resistor control of an electric motor, only two lead wires are required for connection between the power source and the foot controller and between the foot controller and an electric motor circuit. However, where a voltage controlled bidirectional switching device, such as a triac, is utilized for the purpose of speed control of an electric motor, a further additional lead wire is required in order to feedback the induced voltage to the voltage controlled switching device in the foot controller as a control voltage. Thus, in a speed control of an electric motor by means of a voltage controlled bidirectional switching device for phase control, lead wires for power supply cannot be shared for supply of a control signal to a voltage controlled bidirectional switching device.

SUMMARY OF THE INVENTION

According to the present invention, a direct current obtained by rectifying an alternating current voltage by means of a diode bridge circuit is applied to a direct current motor connected to the diode bridge circuit. According to one feature of the present invention, use is made of the fact that the voltage developed across the diode bridge circuit varies, depending on the magnitude of the induced voltage across the motor. To that end, the interjunction of a capacitor series circuit coupled to the bridge circuit is connected through a voltage responsive bidirectional switching device, such as a diac, to a control electrode of a voltage controlled bidirectional switching device, such as a triac, for phase control of the alternating current voltage. One electrode of the voltage responsive bidirectional switching device, such as a diac, is coupled to a variable resistor provided in a gang fashion with a controller, such as a foot controller pedal, so that the voltage obtainable from the variable resistor is superposed on the voltage in the switching device, such as a diac. In operation, therefore, if and when the induced voltage across the motor decreases, an electric charge in the capacitor is discharged and supplied to one electrode of the diac, thereby to control the voltage controlled bidirectional switching device, such that the conduction phase is increased and thus, the speed of the motor is increased. Preferably, the above described capacitor is provided with a series connected discharging resistor.

Accordingly, a principal object of the present invention is to provide a speed control apparatus for an electric motor adapted for compensating fluctuation of torque and rotational speed of the electric motor by virtue of fluctuation of the load of the motor.

Another object of the present invention is to provide a speed control apparatus for an electric motor which is simple in circuit configuration and inexpensive, and wherein the conduction angle of a voltage controlled switching device for phase control is controlled to effect an increased conduction angle in case of an overload of the motor.

A further object of the present invention is to provide an improved speed control apparatus for an electric motor wherein a disadvantage caused by a capacitor connection for detecting an induced voltage across the motor is eliminated.

A further object of the present invention is to provide a speed control apparatus of an electric motor adapted for driving a sewing machine, wherein a voltage controlled bidirectional switching device for phase control of an alternate current voltage is utilized and terminals and lead wires for a power supply can be shared with a terminal and lead wire for a conventional foot controller unit.

Still a further object of the present invention is to provide a speed control apparatus for an electric motor for a sewing machine, wherein a decrease in the speed and torque of the motor, when the needle penetrates thick layers of cloth at low speed operation, can be automatically compensated with a simple and inexpensive circuit configuration.

These and other objects and features, aspects and advantages of the present invention will become more apparent from the following detailed description of the present invention when taken in conjunction with the accompanying drawings.

DESCRIPTION OF THE PREFERRED EMBODIMENTS

Figure 1:
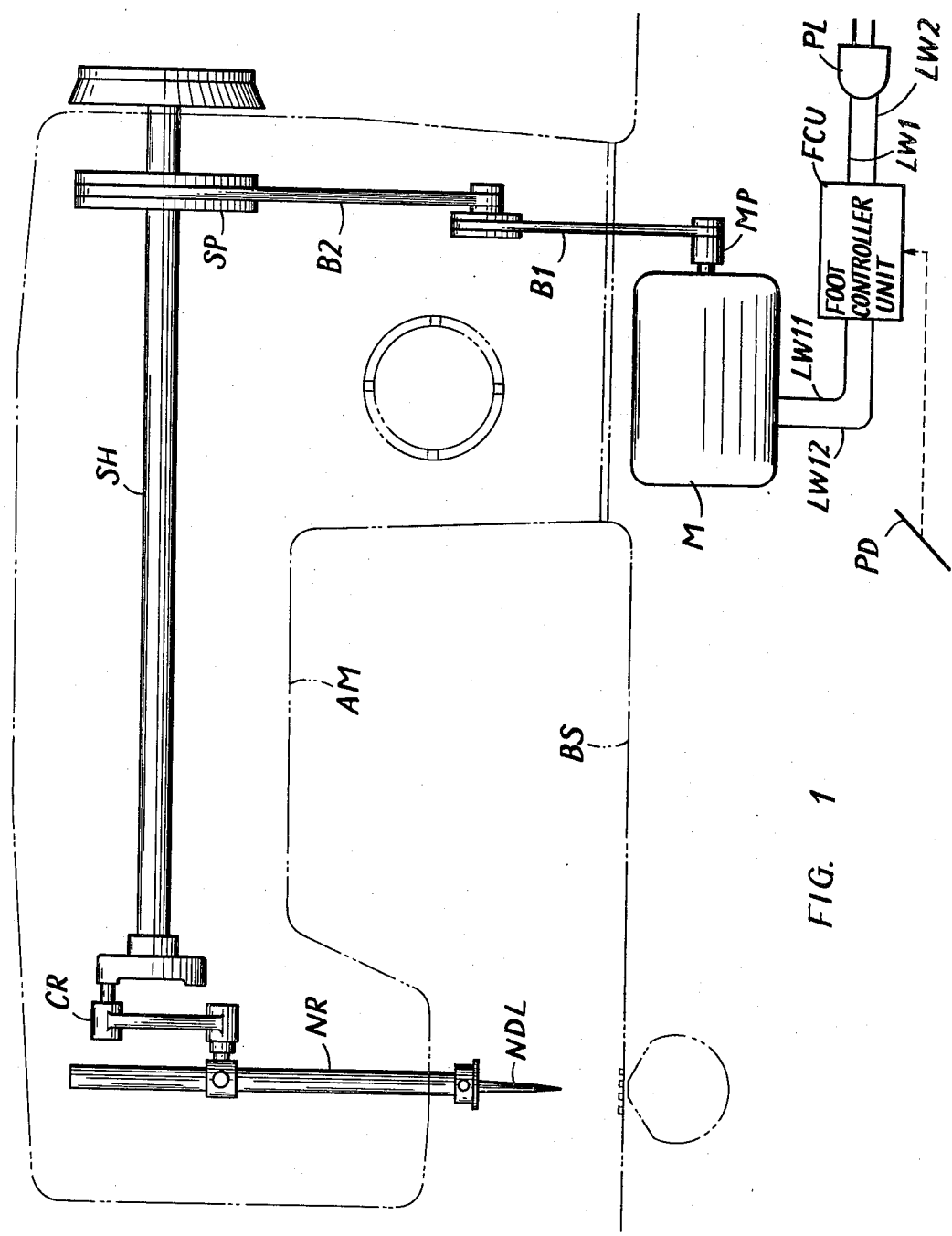
FIG. 1 is a simplified elevational view showing a portion of an electrically driven sewing machine in which the present invention may be advantageously employed.

Referring to FIG. 1, above a machine bed BS is provided a machine arm AM in which various mechanisms are housed, while within the machine bed BS, outside of the machine arm AM, a direct current drive motor M is mounted. A belt B1 engages a pulley MP mounted on the shaft of motor M, which belt serves to transfer the driving force to a belt B2 through an interposed pulley, at a given speed rate. The belt B2 also engages a pulley SP mounted on a main shaft SH which provides the prime mover for various mechanisms in the machine, whereby the pulley SP and thus, the main shaft SH is rotated.

The main shaft SH is coupled to a needle bar NR through a crank CR, such that the needle bar NR is driven in the upward and downward direction as the main shaft SH is rotated. The needle NDL is inserted into the lower end of the needle bar NR. Within the machine bed BS opposite the position of the needle NDL are contained a loop taker and a bobbin in which the lower thread is wound. The needle NDL effects stitch formations with the upper and lower threads in a well known manner.

The driving motor M, is connected to a foot operated controller unit FCU having a foot pedal PD. The degree of depression of the pedal PD controls the speed of the motor M. The contoller unit FCU is connected to a plug PL for connection to an alternate current power source, not shown, for the supply of an alternate current voltage. More specifically, an alternate current voltage from the plug PL is applied through two lead wires LW1 and LW2 to the controller unit FCU. The alternating current voltage is phase controlled by the unit FCU and this voltage is applied through two lead wires LW11 and LW12 to a motor circuit M.

It is pointed out that FIG. 1 shows only the portions of the sewing machine related to the present invention, the other portions being omitted for simplicity of illustration and description.

Figure 2:
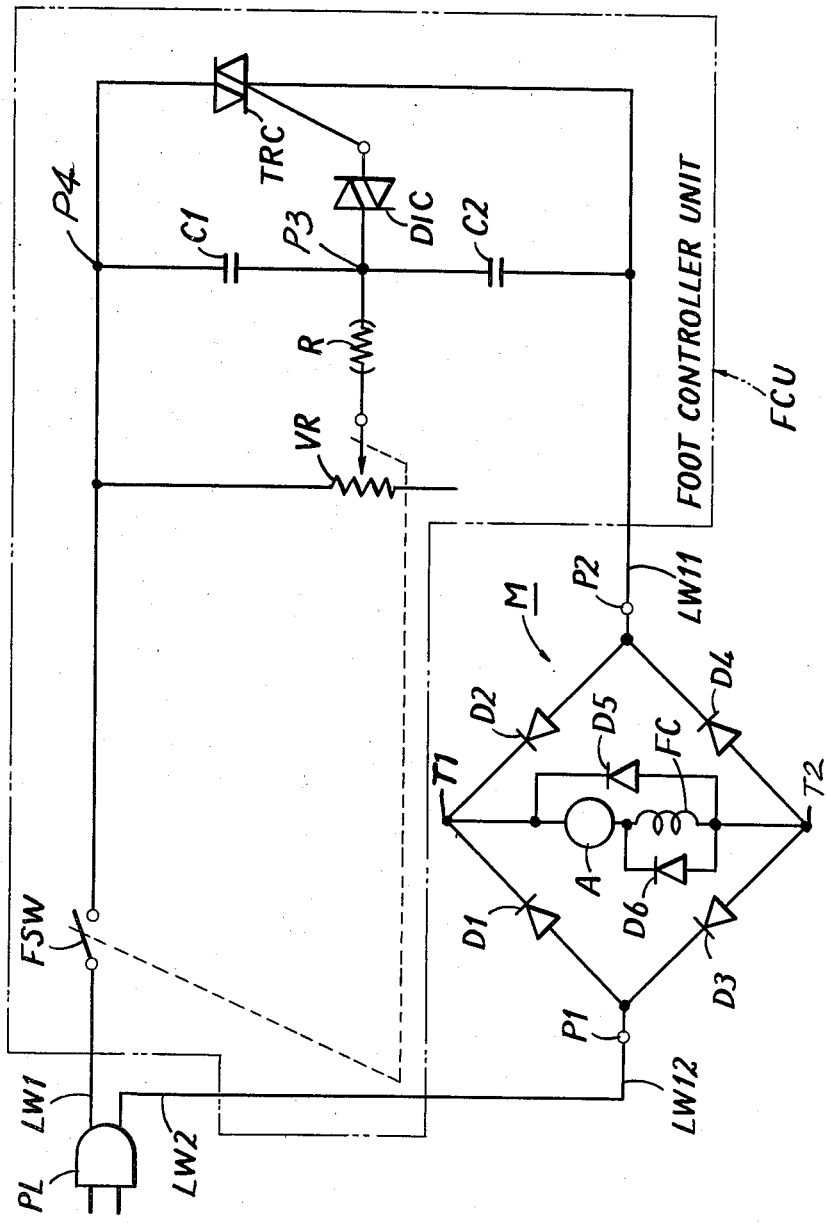
FIG. 2 is a schematic diagram showing one embodiment of the present invention.

FIG. 2 is a schematic diagram showing one embodiment of the present invention. Referring to FIG. 2, the plug PL is intended for connection to a commercial alternating current power supply. The plug PL is connected through a foot switch FSW, mounted in gang fashion with the pedal PD of the controller unit FCU, to a series connection comprising a voltage controlled bidirectional switching device having a control electrode for phase control, such as a triac TRC, and a motor circuit M, thereby forming a main loop or a main circuit. The motor circuit M is formed between a pair of terminals P1 and P2, and includes a series commutator motor in which an armature A and a field coil FC are connected in series. A diode bridge circuit comprising diodes D1, D2, D3 and D4 is connected between terminals P1 and P2, while the above described series connection including armature A and field coil FC is connected between another pair of terminals T1 and T2. The series connection including armature A and field coil FC is shunted with a free wheel diode D5 and the field coil FC is shunted with another free wheel diode D6. A variable resistor VR, the sliding contact of which is adapted to be controlled as a function of depression of the foot control pedal PD, is connected to one terminal of the plug PL. As a result, a voltage which is variable, as a function of the depression of the foot control pedal PD, is obtained through a resistor R from the sliding contract of the variable resistor VR. The triac TRC is shunted by two capacitors C1 and C2 connected in series. The junction of the capacitors C1 and C2 is connected to receive the voltage from the variable resistor VR through the resistor R and is also connected through a voltage responsive bidirectional switching device such, as a diac DIC, to the control electrode of the triac TRC. Thus, the triac TRC is controlled by the conduction phase or angle, as a functon of the conduction angle or phase of the diac DIC.

In operation, first the plug PL is connected to the commercial power supply. The foot pedal PD shown in FIG. 1 is then depressed a given distance. Accordingly, the foot switch FSW is closed and a voltage associated with the depression value of the foot controller pedal PD is obtained from the sliding contact of the variable resistor VR through the resistor R. Therefore, the diac DIC is rendered conductive, as a function of the voltage, and accordingly, the triac TRC is rendered conductive during the conduction phase or angle, as determined, as a function of the output of the diac DIC and thus, as a function of the degree of depression of the foot pedal PD. As a result, the alternating current voltage, as obtained from the plug PL, is phase controlled by means of the triac TRC to the conduction phase or angle associated with the degree of depression of the foot pedal PD. The alternating current voltage, thus phase controlled, is full wave rectified by the diode bridge circuit including the diodes D1 through D4 and the rectified output is applied to the series connection including the armature A and the field coil FC. Thus, the motor circuit M is energized through conduction of the triac TRC and the needle NDL shown in FIG. 1 is caused to be vertically reciprocated. Simultaneously, the capacitors C1 and C2 are charged.

Now considering a situation where an overload is imposed on the motor, such, for example, where the needle NDL penetrates thick layers of cloth. As the motor M is overloaded, the rotation of the motor decreases to a degree that the motor almost stops, and thereby the induced voltage developed between terminals P1 and P2 of the motor circuit M rapidly decreases. Accordingly, the voltage across terminals P1 and P2 and across terminals P2 and P3 decreases respectively, resulting in the increased potential gradient between terminals P4 and P3. Thus, the electric charge stored in the capacitor C1 is discharged and supplied to the diac DIC. As a result, the diac DIC is supplied with the voltage associated with the degree of depression of the controller pedal PD, obtainable through the resistor R from the variable resistor VR, plus the discharging voltage obtained from the capacitor C1. Therefore, the conduction angle of the diac DIC, and thus, of the triac TRC, increases to a larger conduction angle, increased by the voltage corresponding to the discharging electric charge from the capacitor C1, as compared with the conduction angle corresponding to the normal depression of the foot controller pedal PL. Accordingly, the circuit to motor M is supplied with an increased current, so that the required rotational torque and speed can be maintained even in an overload state. The advantage of such capacitor C1 is apparent in the case of low speed of the motor where the resistance of the variable resistor VR is increased. The reason is that in such a low speed range, the total resistance value of variable resistor VR and the resistor R in series, being connected in parallel with capacitor C1, is relatively higher, and current flow through the variable resistor VR is limited. Therefore, the discharging current from capacitor C1 is greater than the current through the variable resistor VR, and larger conduction angles of the triac TRC are gained by virtue of the discharging current from capacitor C1, than those gained from the current through variable resistor VR.

Because of the above described operation, the capacitance value of the capacitor C1 is selected in relation to the total resistance value of the variable resistor VR and the resistor R. More specifically, although the larger the capacitance value of the capacitor C1, the more the torque increases in the overload condition, it is necessary to select the capacitance value of the capacitor C1 such that the diac DIC does not become conductive only with the discharge current from the capacitor C1.

Figure 3:
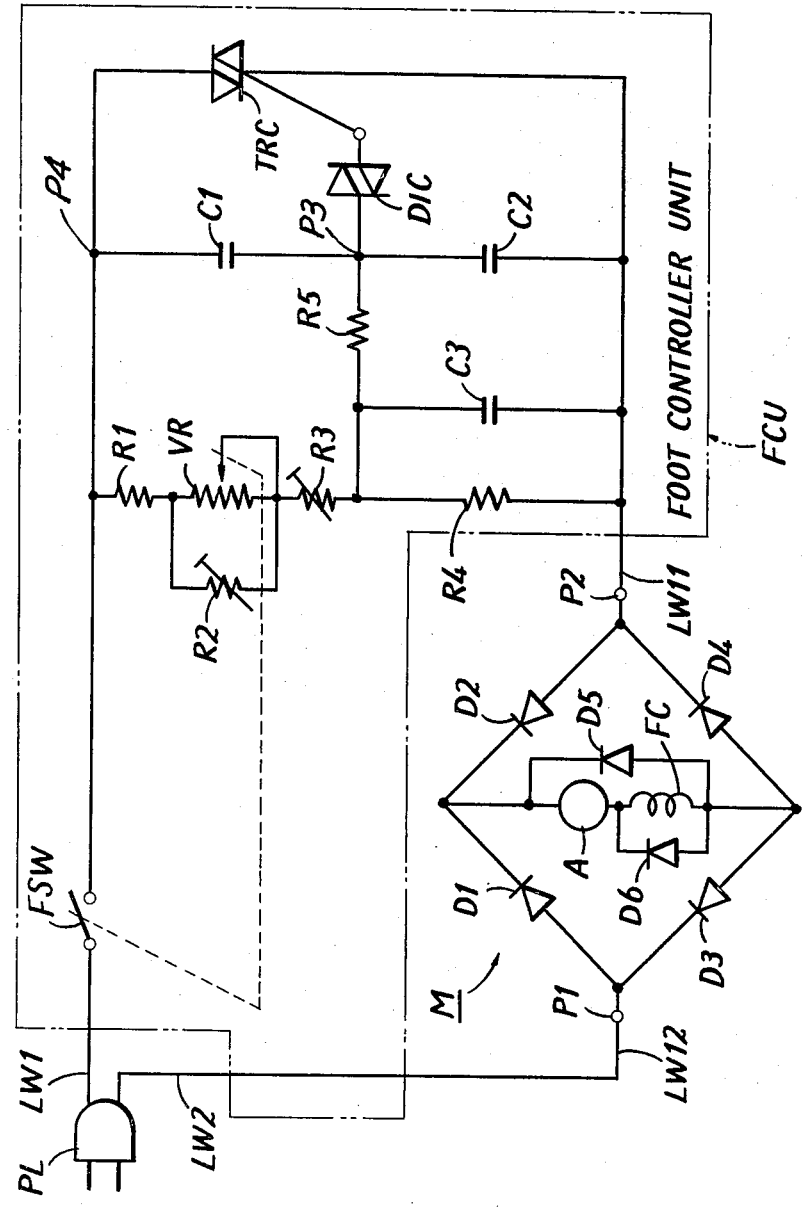
FIG. 3 is a schematic diagram showing another embodiment of the present invention.

FIG. 3 shows another embodiment constituting an improvement for more effectively demonstrating the features of the above described embodiment. Briefly described, the improvement is aimed at preventing the malfunction of a motor which might occur in response to a pulse from the capacitor C1 by virtue of a surge current flowing therein, when the foot controller is depressed. More specifically, a resistor is connected in series with the capacitor C1 to form a bypass circuit so as to prevent the triac TRC from being rendered conductive when the pulse exceeds the breakover voltage of the diac DIC, so as to diminish the adverse affect by the pulse. Referring to FIG. 3, like parts have been denoted by like reference characters, and therefore, a detailed description is omitted. A resistor R1 is inserted as a limiting resistor for limiting the current flowing through the variable resistor VR to a value smaller than a predetermined value, even if the foot pedal PD is fully depressed and the resistance value of the variable resistor VR is made minimal. Semifixed resistors R2 and R3 are provided for fine correction or adjustment of deviation of a preset speed range by virtue of the errors of various circuit components. The resistor R2 is mainly directed to correction of the variable resistor VR and the resistor R3 is mainly to directed to a total fine adjustment of speed. A resistor R5 and a capacitor C3 are provided to constitute a hysteresis decreasing loop. A resistor R4 constitutes an essential feature of the FIG. 3 embodiment as will be apparent from the following description.

In operation, if and when the foot pedal PD shown in FIG. 1 is depressed, a surge current flows into the capacitor C1, as described previously to reach the armature A. However, the current does not flow to the diac DIC before the same is breakedover but rather flows through the resistors R5 and R4. Accordingly, the surge current does not cause the diac DIC, and thus, the triac TRC to be rendered conductive. As a result, a shock caused in the motor M when the foot pedal PD is depressed is eliminated, and thus, any adverse affect on the life of the motor may be avoided. It is pointed out that the resistance value of the resistor R4 is selected so as to be larger than the resistance value of the resistor R5.

As the foot pedal PD is further depressed, the capacitors C2 and C3 are charged. On the other hand, as the pedal PD is released, the capacitors C2 and C3 are discharged. Assuming that an electric charge remains in the capacitors C2 and C3, in such a situation then the above described malfunction occurs. However, according to the embodiment shown, even if the foot pedal PD is released and the resistance value of the variable resistor VR achieves the maximum, the charge in the capacitors C2 and C3 is discharged through the resistors R5 and R4. Therefore, by properly selecting the discharging time constant, the apparatus can be adapted so than an electric charge does not remain in the capacitors C2 and C3, even if the pedal PD, for example, is depressed and released at a rate faster than three times per second. Thus, any malfunction related to the speed of the motor, as described above, caused by the residual electric charge in the capacitors C2 and C3 can be eliminated.

Although the present invention has been described and illustrated in detail, it is to be clearly understood that the same is by way of illustration and example only and is not to be taken by way of limitation, the spirit and scope of the present invention being limited only by the terms of the appended claims.

I claim:

1. A speed control apparatus for an electric motor in an electrically driven sewing machine, comprising alternating current voltage source means, foot operated controller means connected to said alternating current voltage source means through two lead wires, said foot operated controller means comprising a foot operated controller pedal, a variable resistor operatively coupled to said pedal for generating a control voltage in association with the degree of depression of said pedal, a triac having a gate electrode for phase controlling the alternating current from said alternating current voltage source means, a diac connected between said variable resistor and the gate electrode of said triac, and an electric motor adapted to receive the alternating current as phase controlled through said lead wires from said foot operated controller means, said foot controller means further comprising capacitor means connected in parallel with said variable resistor, said capacitor means comprising first and second capacitors connected in series and across said triac, the junction of said first and second capacitors being connected to said diac, whereby said capacitor means is discharged when the induced voltage across the electric motor becomes decreased so as to supply the discharging electric charge to said diac, thereby to increase the conduction angle of said triac.

2. A speed control apparatus for an electric motor in accordance with claim 1, which includes a third capacitor connected in parallel with said second capacitor, and resistor means for constituting a loop for diminishing hysteresis in cooperation with said third capacitor.

3. A speed control apparatus for an electric motor in accordance with claim 2, wherein said resistor means constitutes a discharging resistor for said second capacitor.

* * * * *